United States Patent
Matsumoto

(10) Patent No.: US 11,344,911 B2
(45) Date of Patent: May 31, 2022

(54) SEALANT DISCHARGING NOZZLE AND SEALANT DISCHARGING APPARATUS

(71) Applicant: SUBARU CORPORATION, Tokyo (JP)

(72) Inventor: Yohei Matsumoto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 127 days.

(21) Appl. No.: 16/589,299

(22) Filed: Oct. 1, 2019

(65) Prior Publication Data

US 2020/0114390 A1 Apr. 16, 2020

(30) Foreign Application Priority Data

Oct. 11, 2018 (JP) .............................. JP2018-192790

(51) Int. Cl.
| | |
|---|---|
| *B05C 17/005* | (2006.01) |
| *B05C 5/02* | (2006.01) |
| *B05C 11/02* | (2006.01) |
| *B05C 11/10* | (2006.01) |
| *B25J 11/00* | (2006.01) |

(52) U.S. Cl.
CPC .......... *B05C 17/00503* (2013.01); *B05C 5/02* (2013.01); *B05C 5/0208* (2013.01); *B05C 5/0216* (2013.01); *B05C 5/0254* (2013.01); *B05C 11/023* (2013.01); *B05C 11/1002* (2013.01); *B05C 17/00516* (2013.01); *B25J 11/0075* (2013.01); *B05C 17/0052* (2013.01)

(58) Field of Classification Search
CPC ............ B05C 17/00503; B05C 5/0208; B05C 5/0254; B05C 17/0052; B05C 17/00516; B05C 5/0216; B05C 5/02; B05C 11/023; B05C 11/1002; B05C 1/006; B25J 11/0075
USPC ....................................................... 118/300
See application file for complete search history.

(56) References Cited

U.S. PATENT DOCUMENTS

| | | |
|---|---|---|
| 2006/0163293 A1 | 7/2006 | Peay |
| 2008/0264981 A1 | 10/2008 | Hjort |
| 2015/0044369 A1 | 2/2015 | Keener et al. |

FOREIGN PATENT DOCUMENTS

| | | |
|---|---|---|
| DE | 29911294 U1 | 9/1999 |
| DE | 203 1 9 881 U1 | 4/2004 |
| DE | 20 2014 001 032 U1 | 3/2014 |
| JP | 9276985 | * 10/1997 |

(Continued)

OTHER PUBLICATIONS

Extended European Search Report dated Sep. 10, 2020 in the corresponding European patent application EP19202425.

(Continued)

*Primary Examiner* — Laura Edwards
(74) *Attorney, Agent, or Firm* — Troutman Pepper Hamilton Sanders LLP

(57) ABSTRACT

A sealant discharging nozzle includes a nozzle body, a flat surface, a nozzle positioning portion, and a locating pin. The flat surface is provided on the nozzle body and is formed on a discharge port side of a through hole that extends along a central axis of the nozzle body. The nozzle positioning portion includes a pair of tapered surfaces disposed on both sides of the flat surface in a width direction of the flat surface. The locating pin is formed between the pair of tapered surfaces.

11 Claims, 10 Drawing Sheets

(56) References Cited

FOREIGN PATENT DOCUMENTS

JP        2015-36145 A      2/2015
WO     2012/025748 A1   3/2012

OTHER PUBLICATIONS

Partial European Search Report issued in corresponding European Patent Application No. EP 19 20 2425 dated Apr. 22, 2020.

* cited by examiner

SEALANT DISCHARGING NOZZLE AND SEALANT DISCHARGING APPARATUS

CROSS-REFERENCE TO RELATED APPLICATIONS

The present application claims priority from Japanese Patent Application No. 2018-192790 filed on Oct. 11, 2018, the entire contents of which are hereby incorporated by reference.

BACKGROUND

The present disclosure relates to a sealant discharging nozzle and a sealant discharging apparatus.

SUMMARY

An aspect of the disclosure provides a sealant discharging nozzle including a nozzle body, a flat surface, a nozzle positioning portion, and a locating pin. The flat surface is provided on the nozzle body and formed on a discharge port side of a through hole that extends along a central axis of the nozzle body. The nozzle positioning portion includes a pair of tapered surfaces disposed on both sides of the flat surface in a width direction of the flat surface. The locating pin is formed between the pair of tapered surfaces.

Another aspect of the disclosure provides a sealant discharging apparatus including the sealant discharging nozzle described above, a holding device, a driving device, and an engaging pin. The sealant discharging nozzle is attachable and detachable to and from the holding device. The driving device is coupled to the holding device. The engaging pin is configured to be attached to the holding device and capable of engaging with an engaging groove of the sealant discharging nozzle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Figure 1:
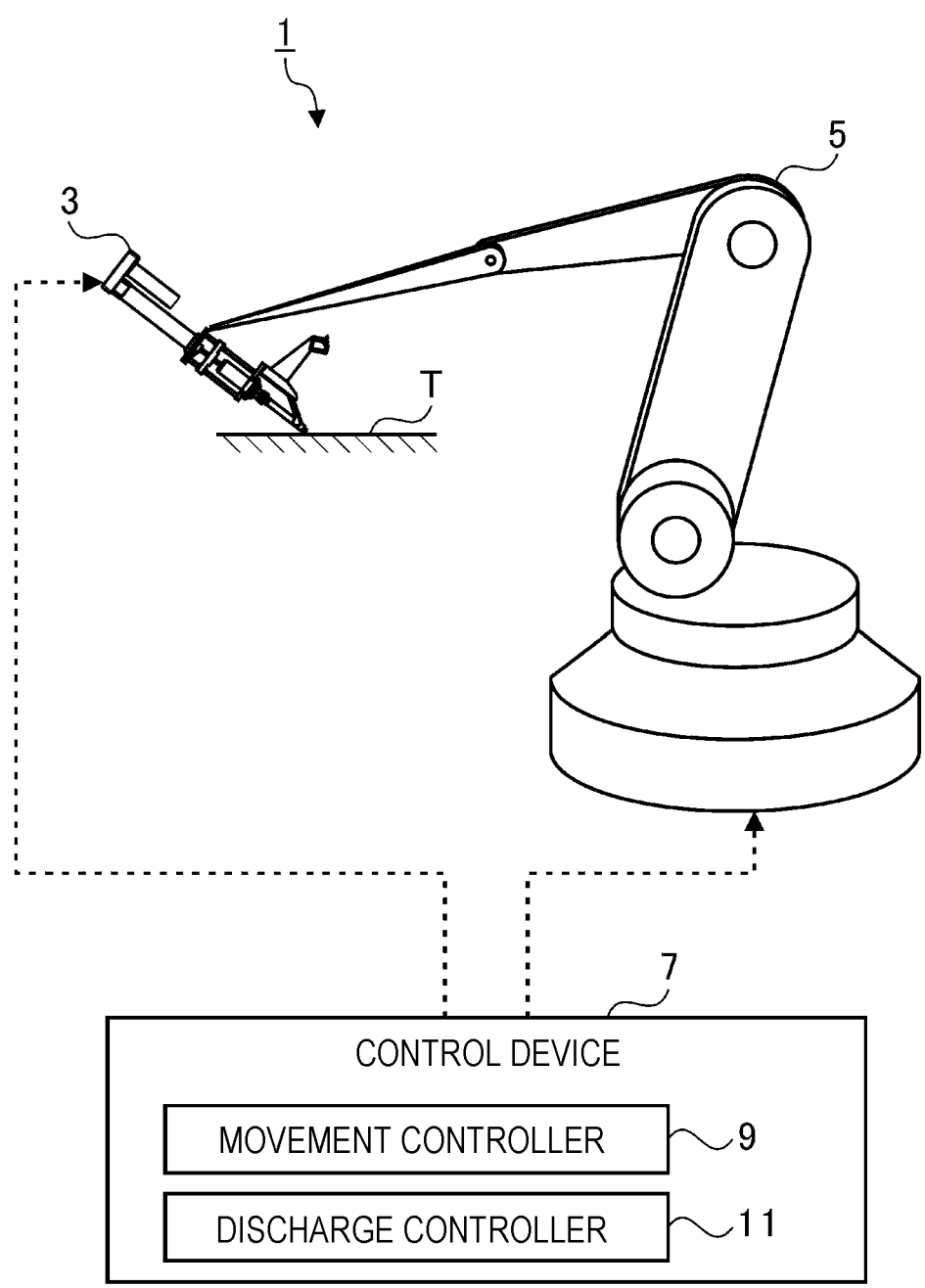
FIG. 1 is a diagram illustrating a configuration of a sealant discharging apparatus.

In the following, a preferred but non-limiting embodiment of the disclosure is described in detail with reference to the accompanying drawings. Note that sizes, materials, specific values, and any other factors illustrated in the embodiment are illustrative for easier understanding of the disclosure, and are not intended to limit the scope of the disclosure unless otherwise specifically stated. Further, elements in the following example embodiment which are not recited in a most-generic independent claim of the disclosure are optional and may be provided on an as-needed basis. Throughout the present specification and the drawings, elements having substantially the same function and configuration are denoted with the same reference numerals to avoid any redundant description. Further, elements that are not directly related to the disclosure are unillustrated in the drawings. The drawings are schematic and are not intended to be drawn to scale.

Japanese Unexamined Patent Application Publication (JP-A) No. 2015-36145 discloses a sealant discharging apparatus that uses a robot arm to apply sealant to a corner formed between two members.

The sealant discharging apparatus in JP-A No. 2015-36145 applies (discharges) the sealant while the nozzle body is separated from the two members. Accordingly, in the sealant discharging apparatus in JP-A No. 2015-36145, it is difficult to set the position the nozzle body. Since positioning of the nozzle body is difficult, the workability in applying the sealant has been poor.

It is desirable to provide a sealant discharging nozzle and a sealant discharging apparatus that are capable of improving the workability in applying the sealant.

FIG. 1 is a diagram illustrating a configuration of a sealant discharging apparatus 1. Note that a flow of a signal is indicated by a broken line arrow in FIG. 1.

As illustrated in FIG. 1, the sealant discharging apparatus 1 includes a seal gun (a holding device) 3, a robot arm (a driving device) 5, and a control device 7. Based on control of the control device 7, the seal gun 3 applies sealant on an object T. Note that a configuration of the seal gun 3 will be described later in detail.

The robot arm 5 includes a plurality of joints and the seal gun 3 is coupled to a leading end of the robot arm 5. An actuator is provided in each joint of the robot arm 5. Based on control of the control device 7, the robot arm 5 drives the actuators to move the seal gun 3 to an optional position at an optional speed.

The control device 7 is a microcomputer including a central processing unit (CPU), a ROM in which a program and the like are installed, a RAM serving as a work area, and the like. The control device 7 expands and executes the program, which is stored in the ROM, on the RAM so as to function as a movement controller 9 and a discharge controller 11.

The movement controller 9 drives and controls the actuators provided in the joints of the robot arm 5. With the above, the robot arm 5 can move the seal gun 3 to an optional position at an optional speed.

The discharge controller 11 controls the discharge amount of the sealant when the sealant is discharged onto an object T from the seal gun 3.

Figure 2:
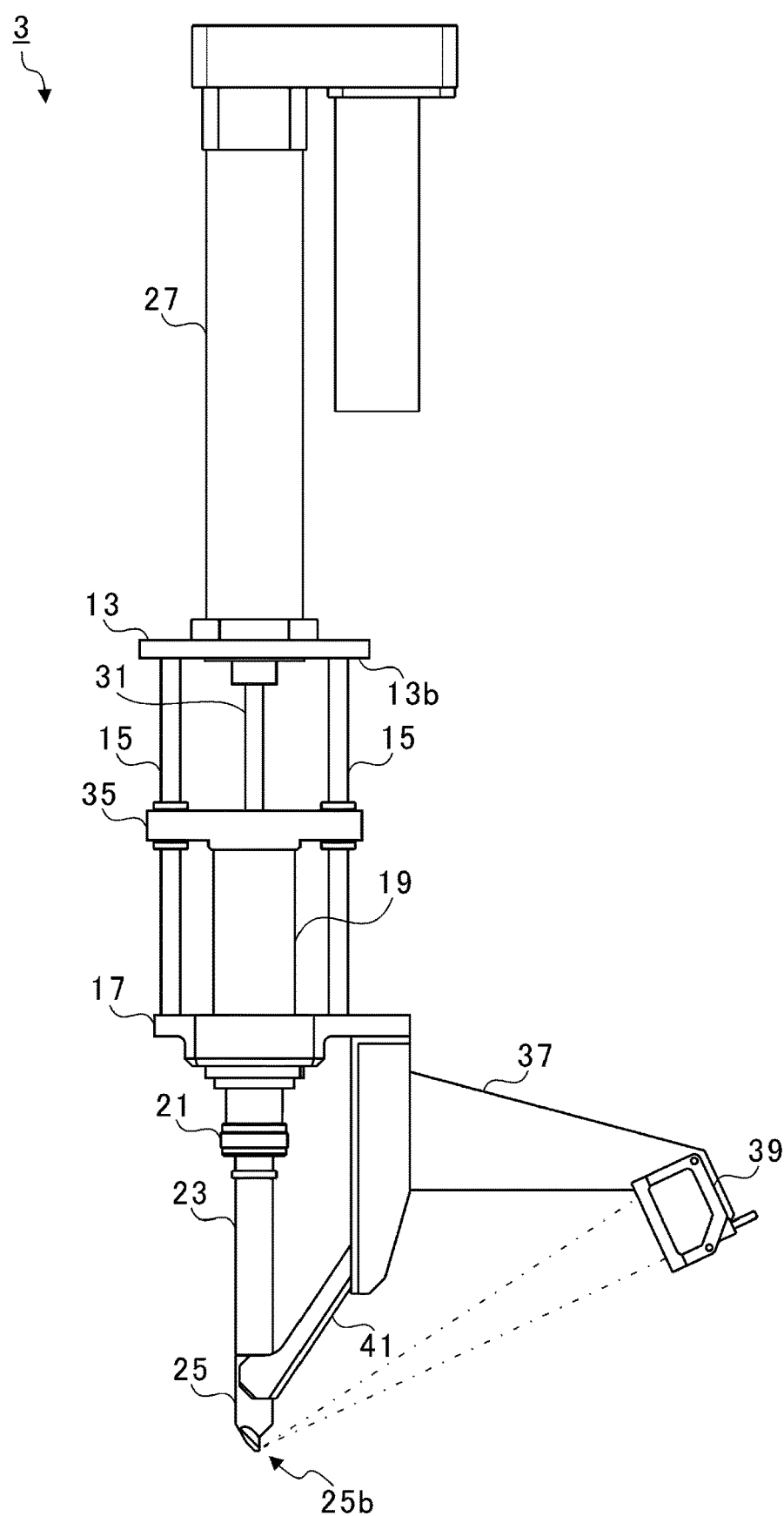
FIG. 2 is a diagram illustrating a configuration of a seal gun.
Figure 3:
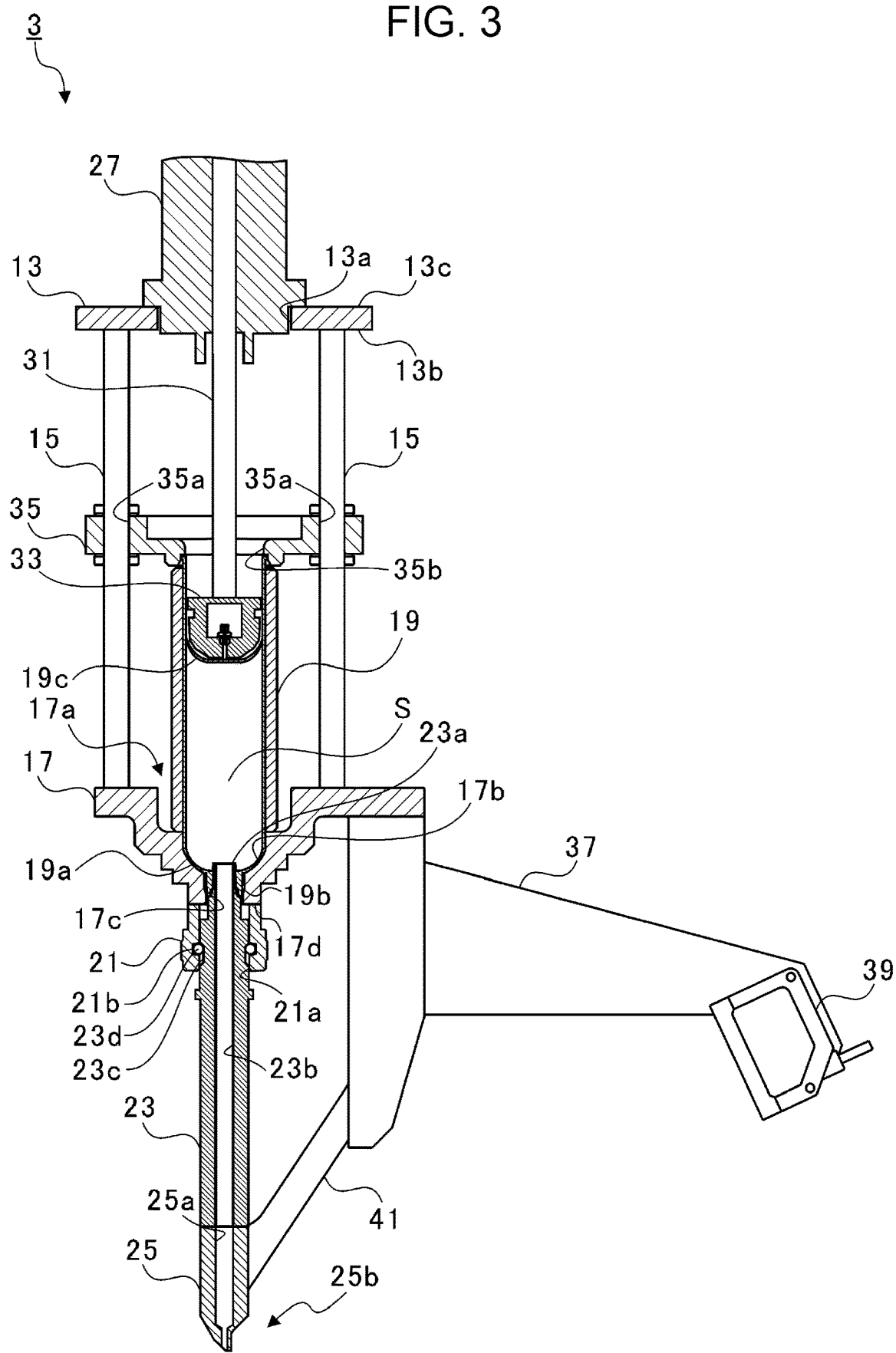
FIG. 3 is a partial cross-sectional view of the seal gun.

FIG. 2 is a diagram illustrating a configuration of the seal gun 3. FIG. 3 is a partial cross-sectional view of the seal gun 3. As illustrated in FIGS. 2 and 3, the seal gun 3 includes a support plate 13, rails 15, a cartridge receiver 17, a cartridge 19, a nozzle chuck 21, a nozzle adapter 23, a nozzle (the sealant discharging nozzle) 25, an actuator 27, a rod 31, a pusher 33, and a press plate 35. The seal gun 3 detachably holds the cartridge 19, the nozzle adapter 23, and the nozzle 25. Note that, herein, a direction in which the pusher 33 moves is referred to as a sliding direction.

The support plate 13 is formed in a plate shape extending in a direction orthogonal to the sliding direction. A through hole 13a penetrating in the sliding direction is provided at the center of the support plate 13. The support plate 13 is supported by the leading end of the robot arm 5 (see FIG. 1). In other words, the seal gun 3 is attached to the robot arm 5 through the support plate 13.

Two rails 15 are attached to the undersurface 13b of the support plate 13. The two rails 15 extending in the sliding direction are provided at symmetrical positions in the support plate 13 with the through hole 13a in between.

The cartridge receiver 17 is attached to the ends of the two rails 15 on the side opposite the support plate 13. A through hole 17a penetrating in the sliding direction is formed at the center of the cartridge receiver 17. The cartridge 19 is inserted into the through hole 17a from the support plate 13 side.

The cartridge 19 is formed in a cylindrical shape, and the tip 19a thereof is formed in a hemispherical shape. Furthermore, a protrusion 19b protruding so as to have a cylindrical shape is formed at the center of the tip 19a.

Sealant S is accommodated inside the cartridge 19. Furthermore, a plunger 19c movable in the sliding direction is provided in the cartridge 19. The cartridge 19 together with the plunger 19c seals the sealant S. The sealant S is a two liquid mixed sealant that becomes cured by mixing two different types of liquid.

A cartridge receiving groove 17b that is depressed in a hemispherical shape that matches the shape of the tip 19a of the cartridge 19 is formed in the through hole 17a of the cartridge receiver 17. Furthermore, a tapered portion 17c is formed at the center of the cartridge receiving groove 17b.

The nozzle chuck 21 is fixed to an undersurface 17d of the cartridge receiver 17. A through hole 21a penetrating in the sliding direction is formed in the nozzle chuck 21. An axial center of the through hole 21a is positioned coaxially with an axial center of the through hole 17a of the cartridge receiver 17. The nozzle adapter 23 is inserted in the through hole 21a of the nozzle chuck 21.

The nozzle adapter 23 is formed in a cylindrical shape. A first end 23a of the nozzle adapter 23 on the cartridge 19 side is inserted inside the protrusion 19b of the cartridge 19. Furthermore, a through hole 23b penetrating in the sliding direction is formed in the nozzle adapter 23. The through hole 23b is in communication with an internal space of the cartridge 19.

A plurality of ball grooves 21b are formed in an inner wall surface of the through hole 21a of the nozzle chuck 21. Furthermore, ball grooves 23c are formed in an outer peripheral surface of the nozzle adapter 23 at positions opposing the ball grooves 21b of the nozzle chuck 21. The ball grooves 23c are formed longer in the sliding direction than the ball grooves 21b. Balls 23d are disposed between the ball grooves 21b and the ball grooves 23c. The nozzle adapter 23 is supported by the nozzle chuck 21 through the balls 23d so as to be movable in the sliding direction.

An end of the nozzle adapter 23 on the side opposite the cartridge 19 is connected to the nozzle 25. A through hole 25a penetrating in the sliding direction is formed in the nozzle 25. The through hole 25a is, as a whole, formed in a cylindrical shape. The through hole 25a is in communication with the through hole 23b of the nozzle adapter 23. A shape of the nozzle 25 will be described later in detail.

The actuator 27 is attached to an upper surface 13c of the support plate 13. The leading end of the actuator 27 is inserted in the through hole 13a of the support plate 13. The rod 31 is accommodated inside the actuator 27 so as to be movable in the sliding direction. Based on the control of the discharge controller 11, the actuator 27 is driven to move the rod 31 in the sliding direction.

The pusher 33 is attached to a tip of the rod 31. The diameter of the pusher 33 formed in a hemispherical shape is smaller than the inner diameter of the cartridge 19. The pusher 33, associated with the movement of the rod 31, pushes the plunger 19c of the cartridge 19 in a discharge direction.

A space in communication with the leading end side (the plunger 19c side) is formed inside the pusher 33. The space formed inside the pusher 33 is connected to a vacuum pump (not shown). By driving the vacuum pump, the pusher 33 is capable of suctioning the plunger 19c.

The two rails 15 are inserted in the press plate 35. The press plate 35 is formed in a plate shape extending in a direction orthogonal to the sliding direction. Through holes 35a through which the rails 15 are inserted are formed in the press plate 35. The press plate 35 is movable along the rails 15. A through hole 35b is formed in the press plate 35 in the sliding direction. A diameter of the through hole 35b is larger than an outer diameter of the pusher 33 and is smaller than an outer diameter of the cartridge 19.

The press plate 35 is moved and controlled with an actuator (not shown). By moving in the sliding direction, the press plate 35 holds the cartridge 19 together with the cartridge receiver 17.

In the seal gun 3 configured in the above manner, when the pusher 33 is, based on the control of the discharge controller 11, moved towards the nozzle 25 side (the lower direction in the drawing), the sealant S accommodated inside the cartridge 19 is pushed by the plunger 19c. With the above, the sealant S passes through the through hole 23b and the through hole 25a with the pushing force of the pusher 33 and is discharged from a tip 25b of the nozzle 25 on the side opposite the nozzle adapter 23.

Furthermore, a measuring instrument support 37, a measuring instrument 39, and a nozzle support 41 are provided in the seal gun 3. The measuring instrument support 37 is attached to the nozzle 25 side of the cartridge receiver 17. The measuring instrument 39 is attached to a leading end of the measuring instrument support 37 on the side opposite the cartridge receiver 17.

The measuring instrument 39 is a ranging sensor. By emitting a laser beam and receiving the emitted laser beam, the measuring instrument 39 is capable of measuring a distance to a position where the laser beam had been reflected. The measuring instrument 39 irradiates the tip 25b of the nozzle 25 with the laser beam, in more detail, the measuring instrument 39 irradiates the sealant S that has been discharged from the nozzle 25 with the laser beam. By measuring the distance to the sealant S discharged from the nozzle 25, the seal gun 3 is capable of measuring the discharge amount of the sealant S.

A first end of the nozzle support 41 is attached to the measuring instrument support 37 and a second end thereof is engaged to the nozzle 25. With the above, the nozzle support 41 restrains the movement of the nozzle 25. A specific configuration of the nozzle 25 will be described below.

Figure 4:
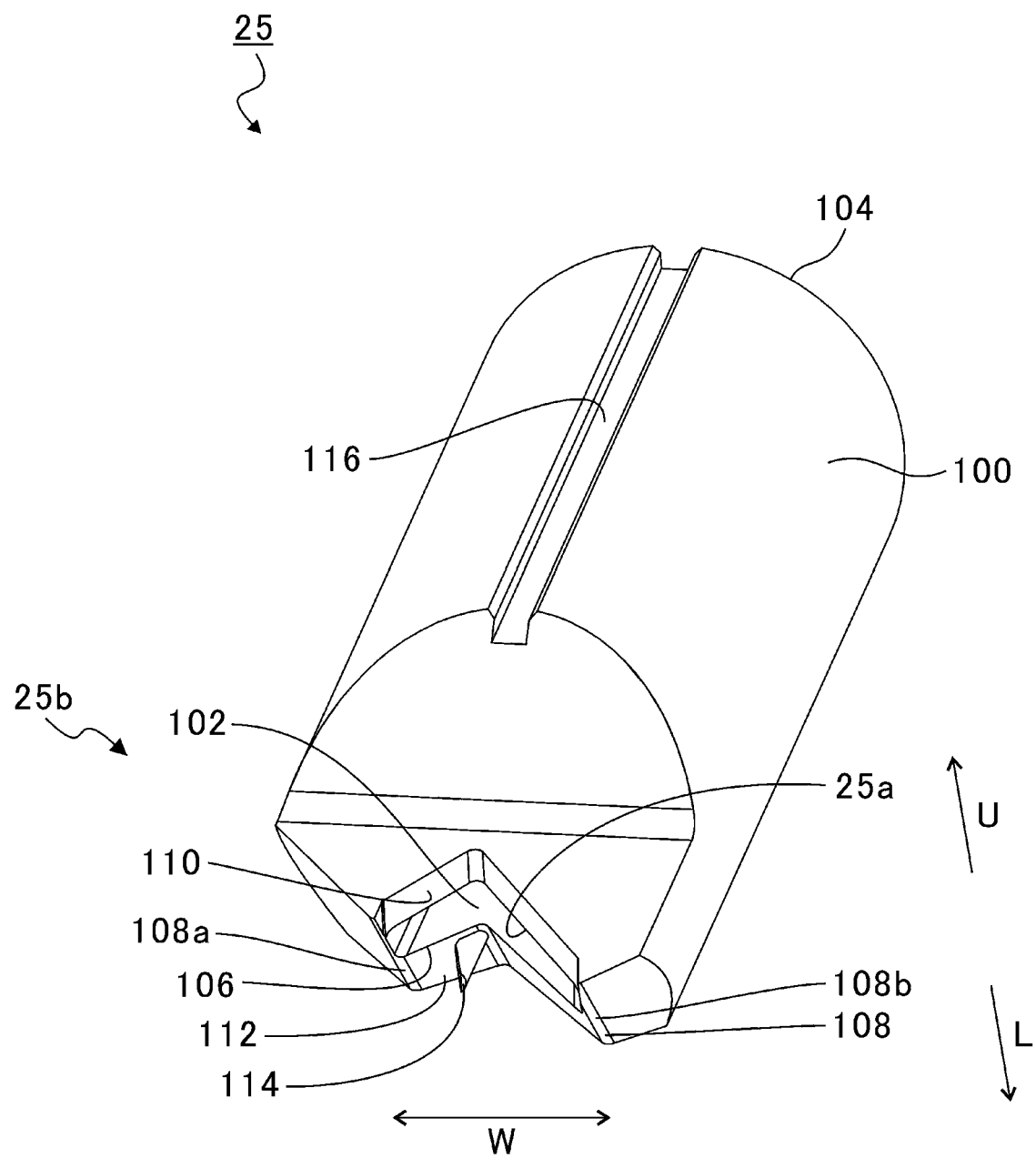
FIG. 4 is a diagram illustrating a configuration of a nozzle.

FIG. 4 is a diagram illustrating the configuration of the nozzle 25. As illustrated in FIG. 4, the nozzle 25 includes a nozzle body 100. The nozzle body 100 has a substantially cylindrical shape. Referring to FIG. 4, a two direction arrow W indicates a width direction of the nozzle body 100. An arrow U is orthogonal to the width direction W and indicates the upward direction (a height direction) of the nozzle body 100. An arrow L is orthogonal to the width direction W and indicates the downward direction (a height direction) of the nozzle body 100.

The through hole 25a is formed inside the nozzle body 100. The through hole 25a extends in a central axis direction (a longitudinal direction) of the nozzle body 100. The through hole 25a penetrates through the nozzle body 100. The through hole 25a forms an inner surface 102 of the nozzle body 100. An introduction port 104 is formed in a first end of the through hole 25a, and a discharge port 106 is formed in a second end thereof.

The introduction port 104 is coupled to the through hole 23b (see FIG. 3) of the nozzle adapter 23. The sealant S supplied from the cartridge 19 (see FIG. 3) through the nozzle adapter 23 is introduced to the introduction port 104. The sealant S introduced through the introduction port 104 flows through the through hole 25a. The discharge port 106 discharges the sealant S that has flowed through the through hole 25a to a portion external to the nozzle body 100. The discharge port 106 has a substantially rectangular shape.

The nozzle body 100 includes a nozzle positioning portion 108, a cutout groove (a cutout) 110, a shaping portion 112, a locating pin 114, and an engaging groove (an engaging portion) 116. The nozzle positioning portion 108, the cutout groove 110, the shaping portion 112, and the locating pin 114 are formed at the tip 25b (an end on the discharge port 106 side) of the nozzle body 100. The engaging groove 116 is formed in a lateral surface (an outer peripheral surface) of the nozzle body 100. The engaging groove 116 extends in the longitudinal direction of the nozzle body 100. Details of the nozzle positioning portion 108, the cutout groove 110, the shaping portion 112, the locating pin 114, and the engaging groove 116 will be described later.

Figure 5:
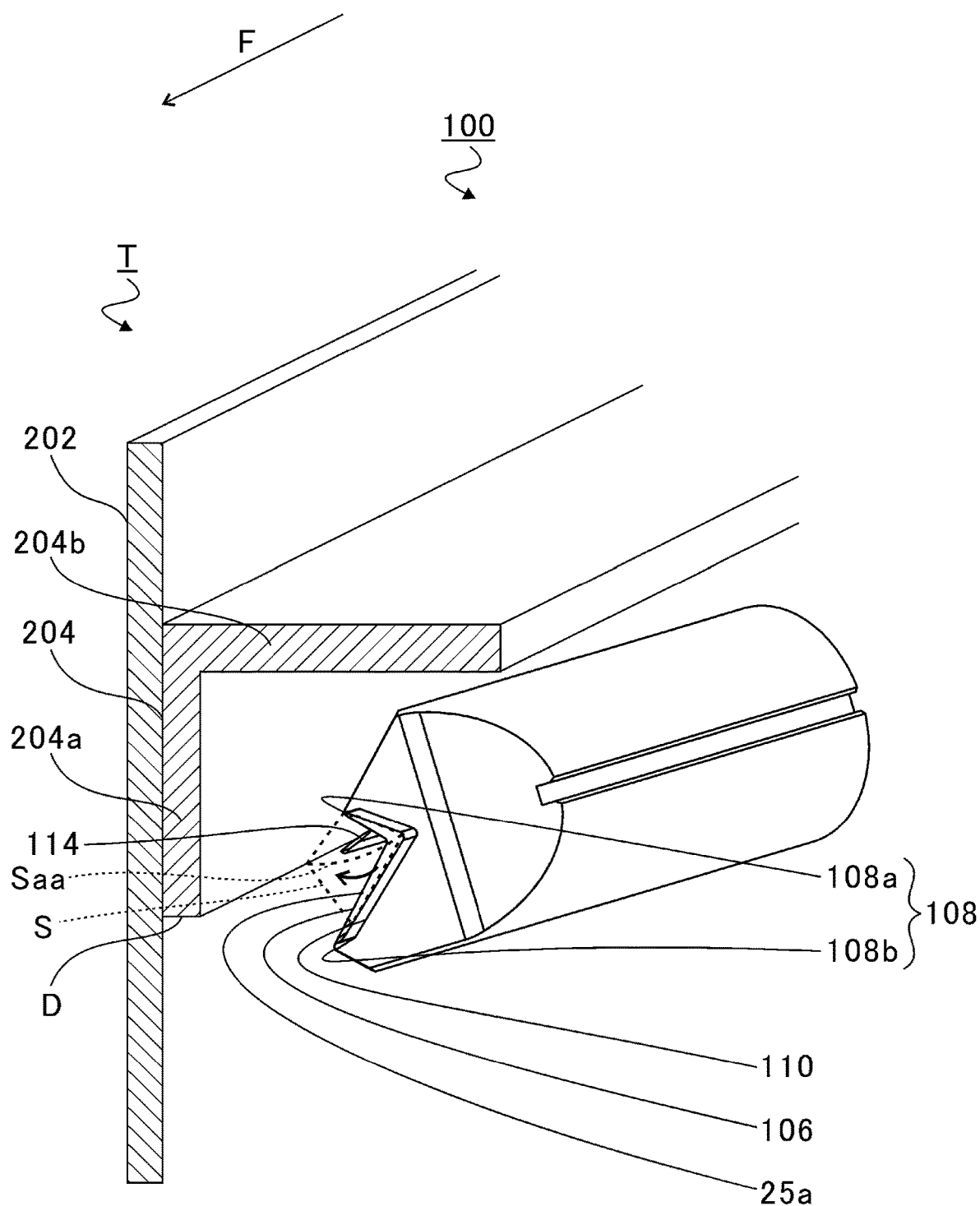
FIG. 5 is a diagram illustrating a state in which a nozzle body is applying sealant on an object.

FIG. 5 is a diagram illustrating a state in which the nozzle body 100 is applying the sealant S on the object T. Referring to FIG. 5, an arrow F indicates an advancing direction of the nozzle body 100. As illustrated in FIG. 5, the object T includes a first applied member 202 and a second applied member 204. The first applied member 202 has a substantially flat plate shape. The second applied member 204 has a substantially L-shape.

The second applied member 204 includes a parallel portion 204a and a perpendicular portion 204b. The parallel portion 204a is disposed substantially parallel to the first applied member 202 and is coupled (connected) to the first applied member 202. The perpendicular portion 204b is disposed substantially perpendicular to the first applied member 202 and is erected in a direction substantially perpendicular to the first applied member 202. A step portion D is formed in a corner between the first applied member 202 and the parallel portion 204a of the second applied member 204.

The nozzle body 100 applies the sealant S to a corner (the step portion D) formed between the first applied member 202 and the second applied member 204. The nozzle body 100 applies the sealant S on the step portion D to seal the step portion D. In so doing, the nozzle positioning portion 108 abuts against the first applied member 202 and the second applied member 204. The nozzle positioning portion 108 has a substantially planar shape.

The nozzle positioning portion 108 includes a first abutting surface 108a and a second abutting surface 108b. The first abutting surface 108a is a surface that is substantially parallel to the second abutting surface 108b. The first abutting surface 108a abuts against a surface of the first applied member 202. The second abutting surface 108b abuts against a surface of the parallel portion 204a of the second applied member 204. With the above, the nozzle body 100 is positioned in a direction orthogonal to the first applied member 202 and the parallel portion 204a of the second applied member 204.

The locating pin 114 sets the position of the nozzle body 100 in a direction parallel to the first applied member 202 and the parallel portion 204a of the second applied member 204. The locating pin 114 is formed between the first abutting surface 108a and the second abutting surface 108b and abuts against the step portion D.

The locating pin 114 abutting against the step portion D sets the position of nozzle body 100 in a direction parallel to the first applied member 202 and the parallel portion 204a of the second applied member 204.

In so doing, the nozzle body 100 is, with respect to the object T, inclined at substantially 45 degrees rearwardly in an advancing direction F. Specifically, the nozzle body 100 is, with respect to the first applied member 202, inclined at substantially 45 degrees rearwardly in the advancing direction F. Furthermore, the nozzle body 100 is, with respect to the parallel portion 204a of the second applied member 204, inclined at substantially 45 degrees rearwardly in the advancing direction F. In the present embodiment, while being inclined substantially 45 degrees towards the side opposite the advancing direction F (rearwardly in the advancing direction F), the nozzle body 100 is held by the seal gun 3 (see FIG. 1).

Note that if the nozzle body 100 were to be displaced perpendicular to the first applied member 202 and the parallel portion 204a of the second applied member 204, when the sealant S is applied to the object T, force that tilts the nozzle body 100 forwardly in the advancing direction F or rearwardly in the advancing direction F will act on the nozzle body 100. As a result, it will be difficult for the nozzle body 100 to apply the sealant S to the object T in a stable manner.

Accordingly, the nozzle positioning portion 108 positions the nozzle body 100 so that the nozzle body 100 is disposed and inclined, with respect to the object T, at substantially 45 degrees rearwardly in the advancing direction F. Specifically, when the nozzle body 100 is inclined at substantially 45 degrees rearwardly in the advancing direction F, the first abutting surface 108a abuts against the surface of the first applied member 202. Furthermore, when the nozzle body 100 is inclined at substantially 45 degrees rearwardly in the advancing direction F, the second abutting surface 108b abuts against the surface of the parallel portion 204a of the second applied member 204. In other words, the first abutting surface 108a and the second abutting surface 108b are a pair of tapered surfaces. With the above, the nozzle body 100 is capable of applying the sealant S to the object T in a stable manner.

The nozzle body 100 is moved in the advancing direction F with the robot arm 5 (see FIG. 1) while the nozzle positioning portion 108 and the locating pin 114 are abutted against the first applied member 202 and the second applied member 204. The nozzle body 100 discharges the sealant S from the discharge port 106 while moving in the advancing direction F.

Figure 6:
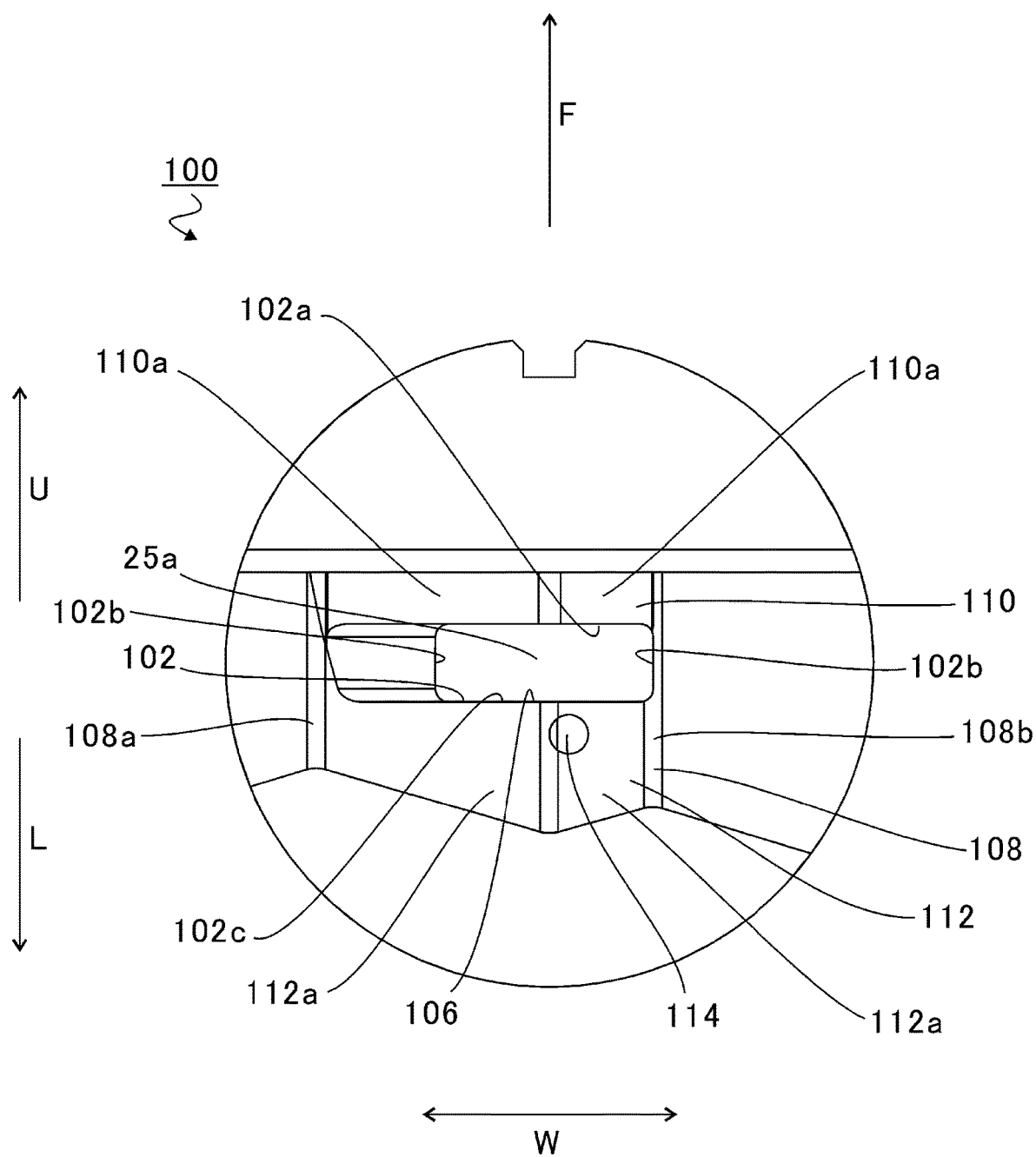
FIG. 6 is a diagram of the nozzle body viewed from a discharge port side.

FIG. 6 is a diagram of the nozzle body 100 viewed from the discharge port 106 side. As illustrated in FIG. 6, the discharge port 106 of the through hole 25a is formed in a substantially rectangular shape. The inner surface 102 of the through hole 25a includes an upper surface 102a, a pair of lateral surfaces 102b, and an undersurface (a flat surface)

102c. The upper surface 102a, the pair of lateral surfaces 102b, and the undersurface 102c are formed on the discharge port 106 side of the through hole 25a, and each have a substantially planar shape that extends along the central axis (the longitudinal direction) of the nozzle body 100. The upper surface 102a is formed on an upward direction U side of the through hole 25a. The pair of lateral surfaces 102b are each formed on the width direction W side of the through hole 25a. The undersurface 102c is formed on a downward direction L side of the through hole 25a.

As it can be understood by referring to FIGS. 4 and 6, the cutout groove 110 of the nozzle body 100 is, with respect to the undersurface 102c of the through hole 25a, formed on the forward side (the upward direction U side in FIG. 6) in the advancing direction F of the nozzle body 100. The cutout groove 110 has a substantially V-shape. In the cutout groove 110, the outside portions are located on the leading end side with respect to the center portion in the width direction W. The cutout groove 110 is adjacent to the inner surface 102 of the through hole 25a (the discharge port 106) and is in communication with the through hole 25a. The cutout groove 110 exposes a portion of the through hole 25a to the outside.

The cutout groove 110 includes a pair of tapered surfaces 110a. The pair of tapered surfaces 110a are inclined against the longitudinal direction of the nozzle body 100. Accordingly, the gap between the tapered surfaces 110a in the width direction W of the nozzle body 100 changes in the longitudinal direction of the nozzle body 100. The gap between the pair of tapered surfaces 110a becomes larger as the tapered surfaces 110a become closer to the discharge port 106, and becomes smaller as the tapered surfaces 110a become distanced away from the discharge port 106. In the width direction W of the nozzle body 100, the maximum width of the cutout groove 110 (in other words, the largest gap between the pair of tapered surfaces 110a) is substantially the same as the width of the discharge port 106. Furthermore, regarding the shape of the cutout groove 110, as the cutout groove 110 becomes closer to the center (the central axis) in the width direction W, the separated distance from the discharge port 106 becomes larger.

Returning to FIG. 5, the sealant S flowing through the through hole 25a is discharged from the discharge port 106. Furthermore, the sealant S flows into the cutout groove 110 from the through hole 25a. The sealant S that has flowed into the cutout groove 110 becomes accumulated along the shape of the cutout groove 110 (in other words, in a substantially V-shape).

In the above, when the nozzle body 100 moves in the advancing direction F, the sealant S that has been discharged from the discharge port 106 and that has been applied to the object T relatively moves rearwardly in the advancing direction F of the nozzle body 100, which is opposite the forward side in the advancing direction F. The sealant S that has been accumulated in a substantially V-shape moves with the flow of the sealant S relatively moving rearwardly in the advancing direction F and, as illustrated by a bent arrow in FIG. 5, is rotationally moved in an arc shape. By having the sealant S that has been accumulated in a substantially V-shape be moved in a rotational manner, as illustrated in FIG. 5, a substantially bicone shape (a substantially rhombus shape) is formed by the sealant S. The corner (step portion D) between the first applied member 202 and the second applied member 204 is filled by the sealant S formed in a substantially bicone shape.

Returning back to FIG. 6 once again, the nozzle positioning portion 108 is formed on both sides (on the outside) of the undersurface 102c of the through hole 25a (the discharge port 106) in the width direction W. Specifically, the first abutting surface 108a and the second abutting surface 108b are formed on both sides of the undersurface 102c of the through hole 25a (the discharge port 106) in the width direction W. The first abutting surface 108a and the second abutting surface 108b are a pair of tapered surfaces that are inclined against the central axis of the nozzle body 100 and that extend in the upward direction U (the advancing direction F) or the downward direction L and in a substantially parallel manner with respect to each other.

The shaping portion 112 of the nozzle body 100 is formed between the first abutting surface 108a and the second abutting surface 108b. The shaping portion 112 has a substantially V-shape. The shaping portion 112 is adjacent to the inner surface 102 of the through hole 25a (the discharge port 106). The shaping portion 112 is formed on the rearward side (on the downward direction L side in FIG. 6) in the advancing direction F of the nozzle body 100 with respect to the undersurface 102c of the through hole 25a (the discharge port 106). In other words, the cutout groove 110 of the nozzle body 100 is formed on a first side with respect to the undersurface 102c of the through hole 25a, and the shaping portion 112 is formed on a second side, which is a side opposite the first side, with respect to the undersurface 102c of the through hole 25a. In the width direction W, a width of the shaping portion 112 is substantially the same as a width of the discharge port 106. The shaping portion 112 shapes the sealant S discharged from the discharge port 106.

The shaping portion 112 includes a pair of tapered surfaces 112a. The pair of tapered surfaces 112a are inclined against the longitudinal direction of the nozzle body 100. The gap between the tapered surfaces 112a in the width direction W of the nozzle body 100 changes in the longitudinal direction of the nozzle body 100. The gap between the pair of tapered surfaces 112a becomes smaller as the tapered surfaces 112a become close to the introduction port 104 (see FIG. 4) in the longitudinal direction of the nozzle body 100 and becomes larger as the tapered surfaces 112a become distanced away from the introduction port 104 in the longitudinal direction. The gap between the pair of tapered surfaces 112a becomes smaller as the tapered surfaces 112a become closer to the center in the width direction W and becomes larger as the tapered surfaces 112a become distanced away from the center. In the width direction W of the nozzle body 100, the maximum width of the shaping portion 112 (in other words, the largest gap between the pair of tapered surfaces 112a) is substantially the same as the width of the discharge port 106.

As it can be understood by referring to FIGS. 4 and 6, the locating pin 114 is formed between the nozzle positioning portion 108 (in other words, the pair of tapered surfaces) in the width direction W of the nozzle body 100. The locating pin 114 is coupled to a valley portion of the substantially V-shaped shaping portion 112. The locating pin 114 extends in the longitudinal direction of the nozzle body 100. A tip of the locating pin 114 has a substantially column shape that has been cut obliquely. The width of the locating pin 114 in the width direction of the nozzle body 100 becomes smaller towards the tip (in other words, as the locating pin 114 becomes distanced away from the shaping portion 112).

Figure 7:
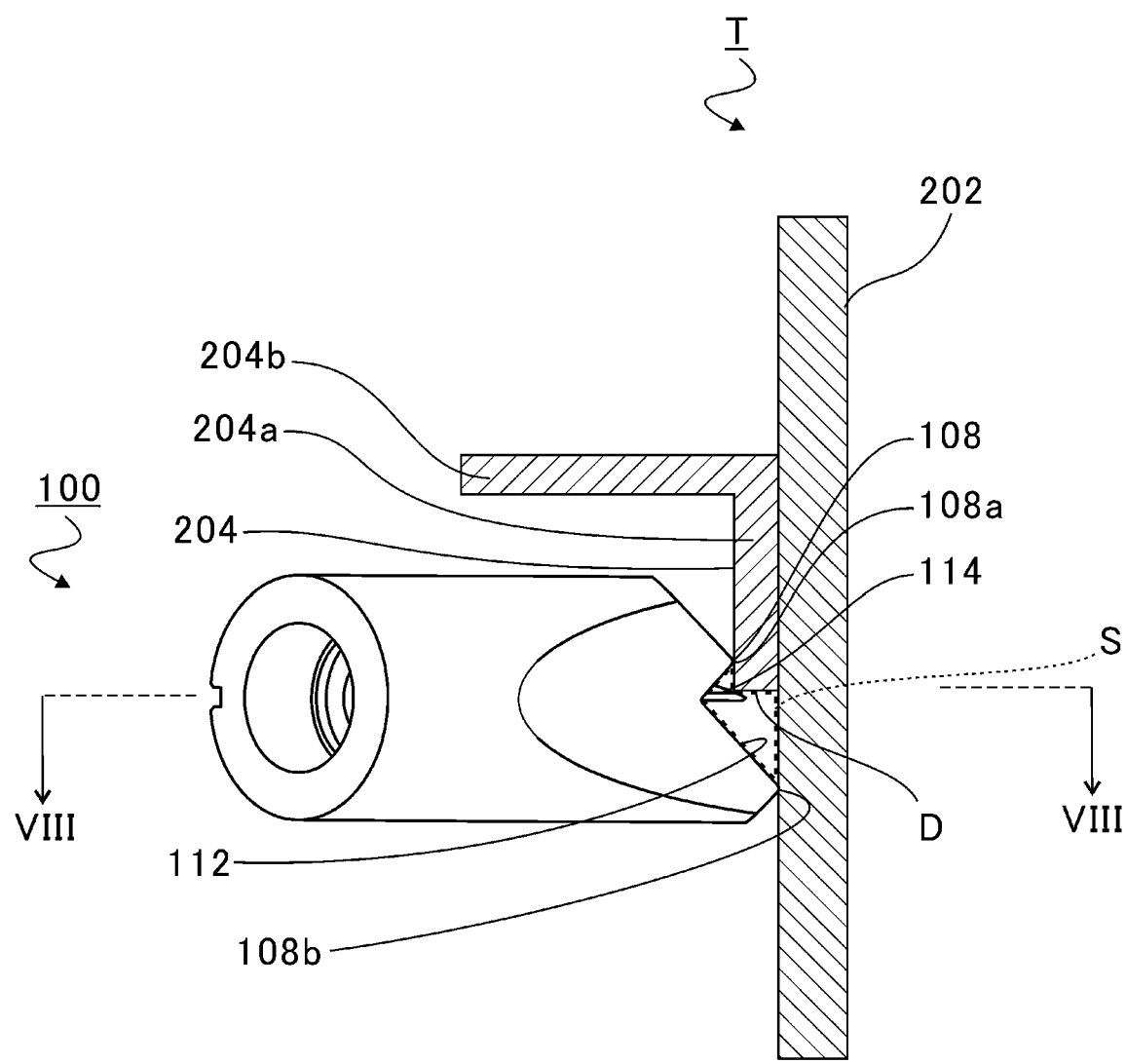
FIG. 7 is a diagram of the nozzle body illustrated in FIG. 5 viewed from a rear side in an advancing direction.

FIG. 7 is a diagram of the nozzle body 100 illustrated in FIG. 5 viewed from the rear side in the advancing direction F. As illustrated in FIG. 7, the nozzle body 100 forms a target sealing cross-sectional shape (a substantially triangular shape in the present embodiment) with the shaping portion 112, the first applied member 202, and the second applied member 204.

Figure 8:
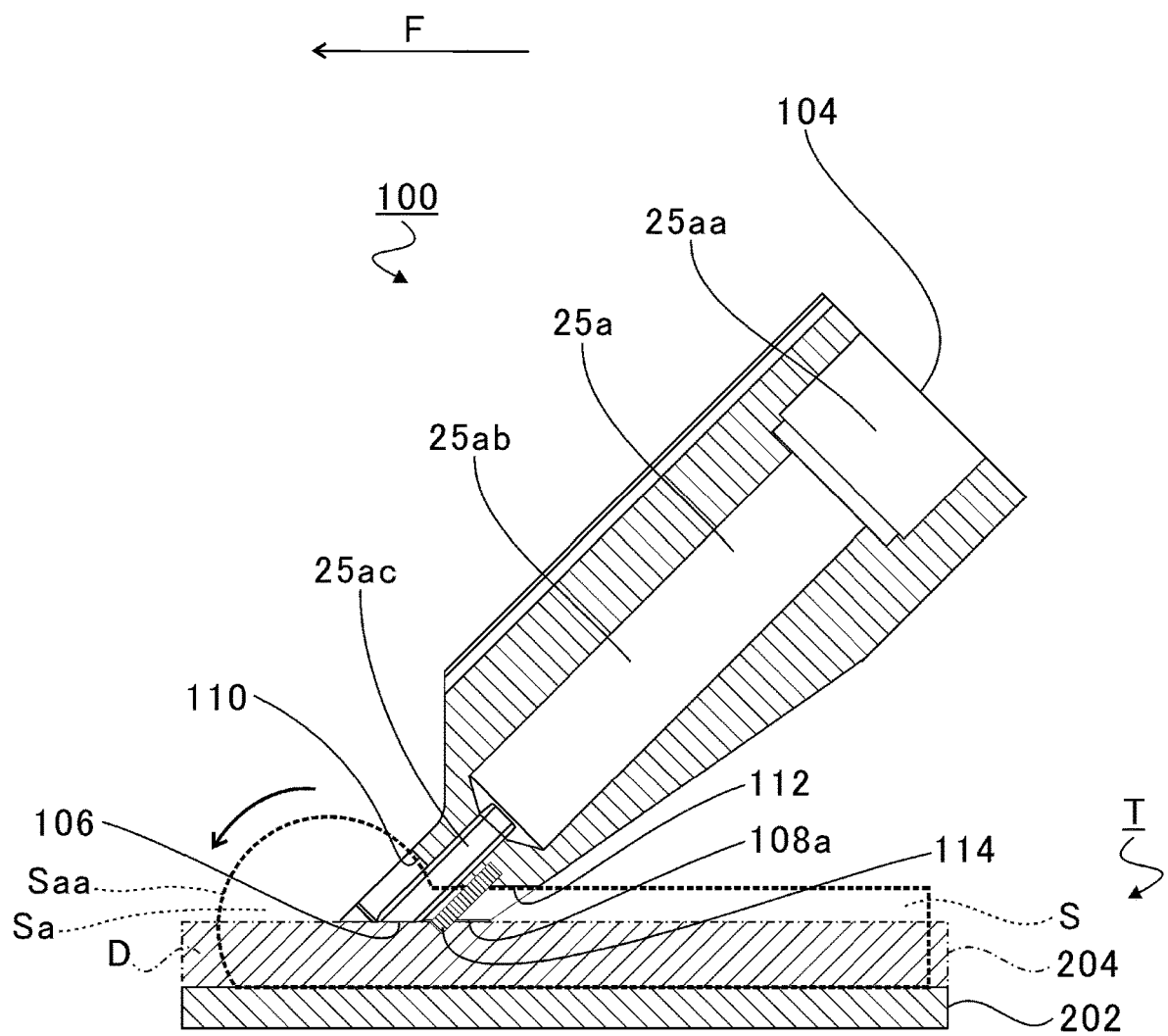
FIG. 8 is a cross-sectional view taken along line VIII-VIII in FIG. 7.

FIG. 8 is a cross-sectional view taken along line VIII-VIII in FIG. 7. As illustrated in FIG. 8, the through hole 25a is formed inside the nozzle body 100. The through hole 25a includes a first circular passage 25aa, a second circular passage 25ab, and a rectangular passage 25ac. A passage cross-sectional shape of the first circular passage 25aa is substantially circular. The first circular passage 25aa extends in the longitudinal direction of the nozzle body 100. A first end of the first circular passage 25aa is connected with the introduction port 104 of the nozzle body 100, and a second end is connected with the second circular passage 25ab.

A passage cross-sectional shape of the second circular passage 25ab is substantially circular. The second circular passage 25ab extends in the longitudinal direction of the nozzle body 100. A first end of the second circular passage 25ab is connected with the first circular passage 25aa, and a second end is connected with the rectangular passage 25ac. An inner diameter of the second circular passage 25ab is smaller than an inner diameter of the first circular passage 25aa. Since the passage cross-sectional shapes of the first circular passage 25aa and the second circular passage 25ab are substantially circular, the pipeline resistance when the sealant S flows therethrough can be small.

A passage cross-sectional shape of the rectangular passage 25ac is substantially rectangular. The rectangular passage 25ac extends in the longitudinal direction of the nozzle body 100. A first end of the rectangular passage 25ac is connected with the second circular passage 25ab, and a second end is connected with the discharge port 106 of the nozzle body 100. Since the passage cross-sectional shape of the rectangular passage 25ac is substantially rectangular, a flat and band-shaped (in other words, a layered) sealant S can be discharged from the discharge port 106.

Furthermore, an end of the rectangular passage 25ac on the discharge port 106 side is, with the cutout groove 110, exposed to an external portion on the forward side in the advancing direction F of the nozzle body 100. A portion of the sealant S flowing in the rectangular passage 25ac is discharged from the discharge port 106, and the other portion flows into the cutout groove 110. By moving towards the forward side in the advancing direction F of the nozzle body 100 and due to the shape of the cutout groove 110, the sealant S that has flowed into the cutout groove 110 is formed into a substantially bicone shape (a substantially rhombus shape). With the above, on the forward side in the advancing direction F of the nozzle body 100, a bicone shaped portion Sa is formed on the object T with the sealant S. As illustrated in FIG. 5, a protrusion Saa, in which the interior angle is substantially a right angle, is formed on the outer peripheral surface of the bicone shaped portion Sa. The interior angle of the protrusion Saa is substantially the same as the angle of the corner between the first applied member 202 and the second applied member 204.

When the nozzle body 100 moves forwardly in the advancing direction F, the bicone shaped portion Sa rotates and moves in the bent arrow direction in FIG. 8, and the protrusion Saa becomes adhered to the corner (step portion D) between the first applied member 202 and the second applied member 204. In other words, when the nozzle body 100 moves forwardly in the advancing direction F, the bicone shaped portion Sa seals the step portion D between the first applied member 202 and the second applied member 204.

Note that when the sealant S having a circular cross-sectional shape or a rectangular cross-sectional shape is formed (in other words, when the bicone shaped portion Sa is not formed) on the object T, it will be difficult for the sealant S to adhere to the step portion D between the first applied member 202 and the second applied member 204. In other words, it will be difficult for the sealant S to seal the step portion D between the first applied member 202 and the second applied member 204 if the bicone shaped portion Sa is not formed. As a result, air (bubbles) tend to become mixed into the sealant S applied on the object T.

On the other hand, when the bicone shaped portion Sa is formed on the object T, it will be easier for the sealant S to adhere to the step portion D between the first applied member 202 and the second applied member 204. In other words, it will be easy for the sealant S to seal the step portion D between the first applied member 202 and the second applied member 204 when the bicone shaped portion Sa is formed. As a result, air (bubbles) tend not to become mixed into the sealant S applied on the object T.

The sealant S that has sealed the step portion D between the first applied member 202 and the second applied member 204 relatively moves rearwardly in the advancing direction F of the nozzle body 100 as the nozzle body 100 moves in the advancing direction F. The shaping portion 112 is disposed on the rearward side in the advancing direction F of the discharge port 106.

The shaping portion 112 is disposed so as to be inclined at substantially 45 degrees against the longitudinal direction of the nozzle body 100.

Returning back to FIG. 7, the sealant S that has relatively moved rearwardly in the advancing direction F from the discharge port 106 is pushed towards the first applied member 202 side and the second applied member 204 side with the shaping portion 112. A substantially triangular space is formed between the shaping portion 112, the first applied member 202, and the second applied member 204.

The shaping portion 112 squashes the sealant S to accommodate the sealant S into the space enclosed by the shaping portion 112, the first applied member 202, and the second applied member 204. With the above, the shaping portion 112 shapes the sealant S into a band shape having a substantially triangular cross-sectional shape.

Figure 9:
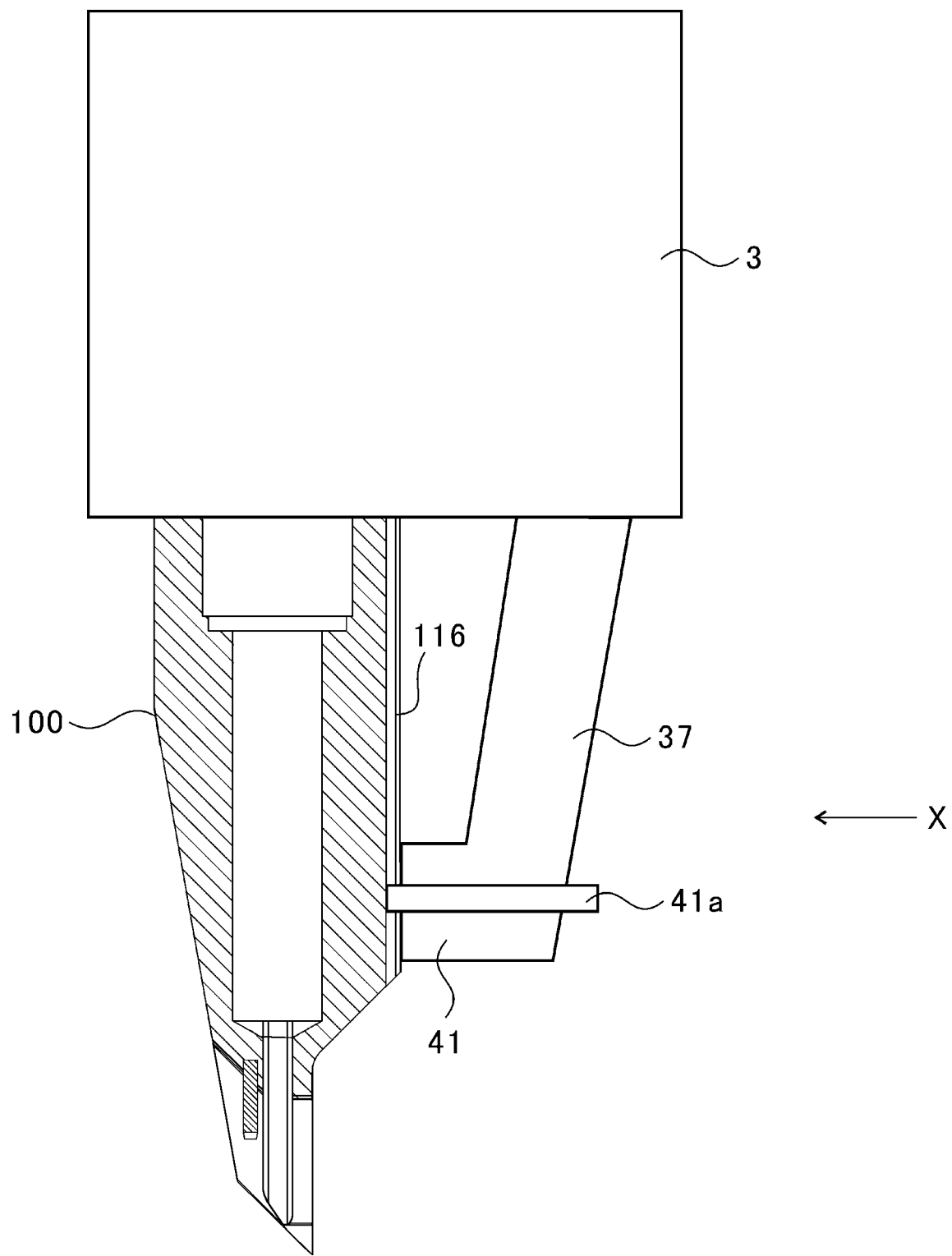
FIG. 9 is a diagram illustrating a state in which the nozzle body is attached to the seal gun.

FIG. 9 is a diagram illustrating a state in which the nozzle body 100 is attached to the seal gun 3. As illustrated in FIG. 9, the seal gun 3 includes the measuring instrument support 37 and the nozzle support 41. The nozzle support 41 further includes a locating pin (an engaging pin) 41a. The locating pin 41a has a substantially columnar shape and is capable of engaging with the engaging groove 116 of the nozzle body 100. The locating pin 41a is engaged with the engaging groove 116 of the nozzle body 100 when the nozzle body 100 is attached to the seal gun 3.

Figure 10:
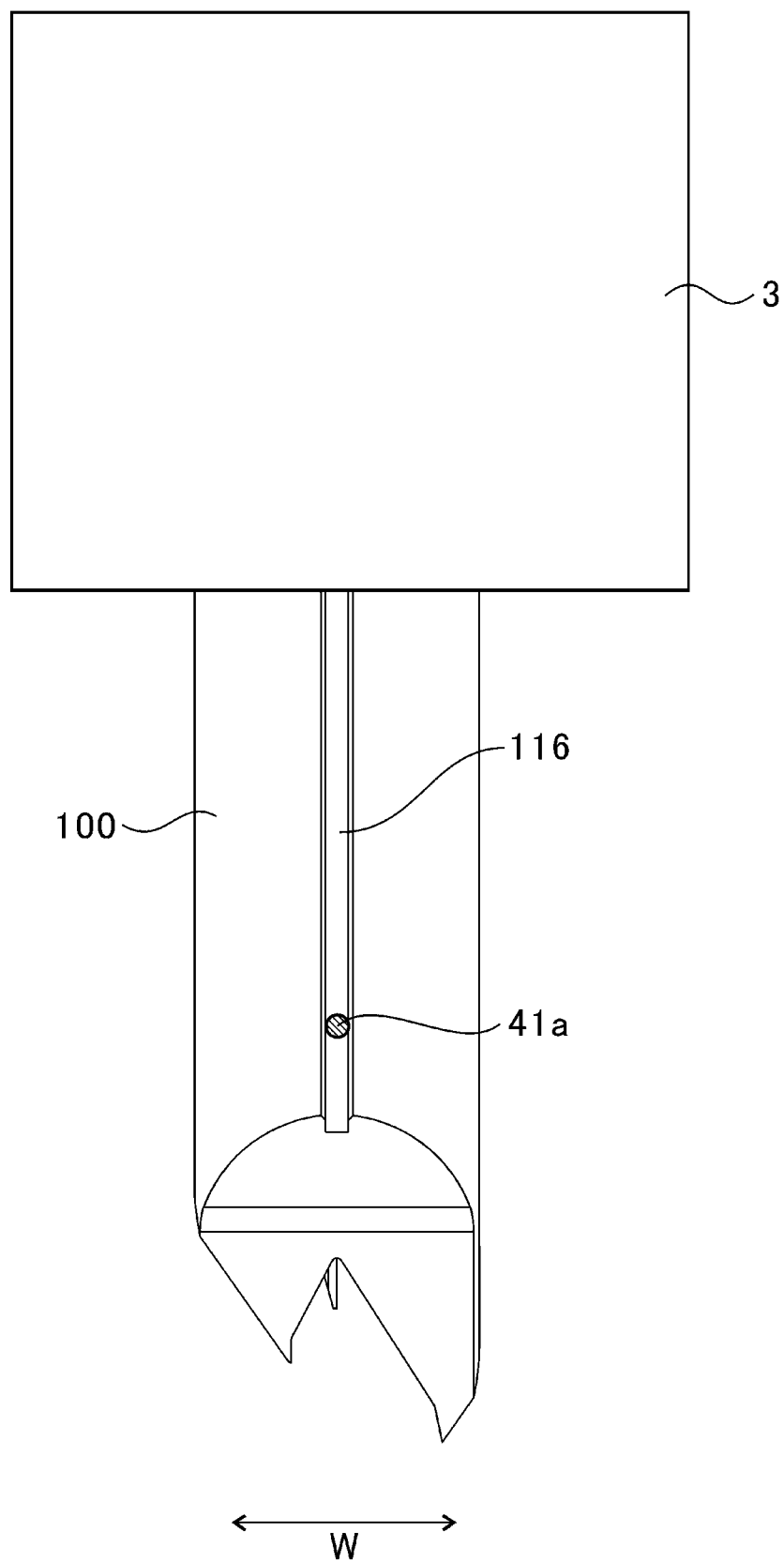
FIG. 10 is a view taken in a direction of an arrow X illustrated in FIG. 9.

FIG. 10 is a view taken in a direction of an arrow X illustrated in FIG. 9. In FIG. 10, the measuring instrument support 37 and the nozzle support 41 are not illustrated. As illustrated in FIG. 10, in the width direction W of the nozzle body 100, a width (a diameter) of the locating pin 41a is substantially the same as a width of the engaging groove 116. Accordingly, when the locating pin 41a and the engaging groove 116 are engaged to each other, the movement of the nozzle body 100 in the width direction W becomes restricted. When the locating pin 41a and the engaging groove 116 are engaged to each other, the nozzle body 100 can move only in the direction in which the engaging groove 116 extend (in other words, in the longitudinal direction of the nozzle body 100).

When the nozzle body 100 moving in the longitudinal direction of the nozzle body 100 is coupled to the seal gun 3, the movement in the longitudinal direction of the nozzle body 100 becomes restricted. Furthermore, the movement of the nozzle body 100 in a circumferential direction (about the central axis) of the nozzle body 100 becomes restricted by the locating pin 41a. As described above, the locating pin 41a is capable of restricting the rotation of the nozzle body 100 about the central axis after the nozzle body 100 has been coupled to the seal gun 3.

The nozzle body 100 according to the present embodiment includes the nozzle positioning portion 108 and the locating pin 114. The nozzle positioning portion 108 sets the position of the nozzle body 100 in a direction orthogonal to the first applied member 202 and the parallel portion 204a of the second applied member 204. The locating pin 114 sets the position of the nozzle body 100 in a direction parallel to the first applied member 202 and the parallel portion 204a of the second applied member 204. With the above, the sealant discharging apparatus 1 can easily set the position of the nozzle body 100. As a result, the workability in applying the sealant S can be improved.

Furthermore, when the nozzle body 100 moves forwardly in the advancing direction F while discharging the sealant S, the cutout groove 110 of the nozzle body 100 forms the bicone shaped portion Sa. The bicone shaped portion Sa adheres to the corner between the first applied member 202 and the second applied member 204. In other words, the nozzle body 100 of the present embodiment can increase the adhesion of the sealant S applied to the corner between the first applied member 202 and the second applied member 204. With the above, bubbles will not be easily mixed in the sealant S formed on the object T.

Furthermore, the shaping portion 112 of the nozzle body 100 squashes the bicone shaped portion Sa formed with the cutout groove 110. By having the shaping portion 112 squash the bicone shaped portion Sa, the sealant S can be shaped so as to have a target sealing cross-sectional shape. In other words, by including the shaping portion 112, the nozzle body 100 will not need the shaping process of shaping the sealant S, which has been applied on the object T, with a spatula member. As described above, the nozzle body 100 of the present embodiment can improve the workability in applying the sealant S on the object T.

A description has been given with reference to the accompanying drawings; however, it goes without saying that the present disclosure is not limited to the above embodiment. It is apparent to those skilled in the art that various modifications or amendments can be perceived within the scope of the claims, and it goes without saying that it is understood that the above modifications and amendments are within the technical scope of the present disclosure.

In the embodiment described above, the cutout groove 110 has been described, as an example, to have a substantially V-shape. However, not limited to the above, the cutout groove 110 may have other shapes such as, for example, a substantially U-shape.

In the embodiment described above, the nozzle body 100 has been described, as an example, to include the cutout groove 110. However, not limited to the above, the nozzle body portion 100 does not have to include the cutout groove 110.

In the embodiment described above, the nozzle body 100 has been described, as an example, to include the shaping portion 112. However, not limited to the above, the nozzle body portion 100 does not have to include the shaping portion 112.

In the embodiment described above, the nozzle body 100 has been described, as an example, to include the engaging groove 116 that engages with the locating pin 41a. However, not limited to the above, the nozzle body portion 100 does not have to include the engaging groove 116. For example, the nozzle body 100 may include the locating pin 41a, and the nozzle support 41 may include the engaging groove 116.

The present disclosure is capable of improving the workability in applying the sealant.

The invention claimed is:

1. A sealant discharging nozzle comprising:
   a nozzle body;
   a planar surface provided on the nozzle body, the planar surface being formed on a discharge port side of a through hole that extends along a central axis of the nozzle body;
   a nozzle positioning portion that comprises a pair of tapered surfaces disposed on both sides of the planar surface in a width direction of the planar surface, wherein the sides of the planar surface comprises a first side and a second side,
   a cutout is formed on the first side with respect to the planar surface, and the cutout comprises a substantially V-shape such that a separated distance from the discharge port becomes larger as the cutout becomes closer to a center in the width direction of the planar surface;
   a locating pin formed between the pair of tapered surfaces, and
   a shaping portion that is, with respect to the planar surface, formed on the second side opposite to the first side, the shaping portion disposed so as to be inclined at substantially forty-five degrees against a longitudinal direction of the nozzle body.

2. The sealant discharging nozzle according to claim 1, wherein
   the locating pin is formed in the shaping portion.

3. The sealant discharging nozzle according to claim 2, wherein
   the cutout comprises a substantially V-shape such that a separated distance from the discharge port becomes larger as the cutout becomes closer to a center in the width direction of the planar surface.

4. A sealant discharging apparatus comprising:
   a sealant discharging nozzle according to claim 1;
   a seal gun to and from which the sealant discharging nozzle is attachable and detachable;
   a robot arm coupled to the seal gun; and
   an engaging pin configured to be attached to the seal gun, the engaging pin being capable of engaging with an engaging groove of the sealant discharging nozzle.

5. A sealant discharging apparatus comprising:
   a sealant discharging nozzle according to claim 2;
   a seal gun to and from which the sealant discharging nozzle is attachable and detachable;
   a robot arm coupled to the seal gun; and
   an engaging pin configured to be attached to the seal gun, the engaging pin being capable of engaging with an engaging groove of the sealant discharging nozzle.

6. A sealant discharging apparatus comprising:
   a sealant discharging nozzle according to claim 3;
   a seal gun to and from which a sealant discharging nozzle is attachable and detachable;
   a robot arm coupled to the seal gun; and
   an engaging pin configured to be attached to the seal gun, the engaging pin being capable of engaging with an engaging groove of the sealant discharging nozzle.

7. The sealant discharging apparatus according to claim 4, wherein
   the sealant discharging nozzle is configured to be held by the seal gun while being inclined.
8. The sealant discharging apparatus according to claim 5, wherein
   the sealant discharging nozzle is configured to be held by the seal gun while being inclined.
9. The sealant discharging apparatus according to claim 6, wherein
   the sealant discharging nozzle is configured to be held by the seal gun while being inclined.
10. The sealant discharging nozzle according to claim 1, wherein
    the shaping portion has a substantially V-shape such that a separated distance from the discharge port becomes larger as the shaping portion becomes closer to the center in the width direction of the planar surface.
11. The sealant discharging nozzle according to claim 2, wherein
    the shaping portion has a substantially V-shape such that a separated distance from the discharge port becomes larger as the shaping portion becomes closer to the center in the width direction of the planar surface.

* * * * *